United States Patent Office 3,340,094
Patented Sept. 5, 1967

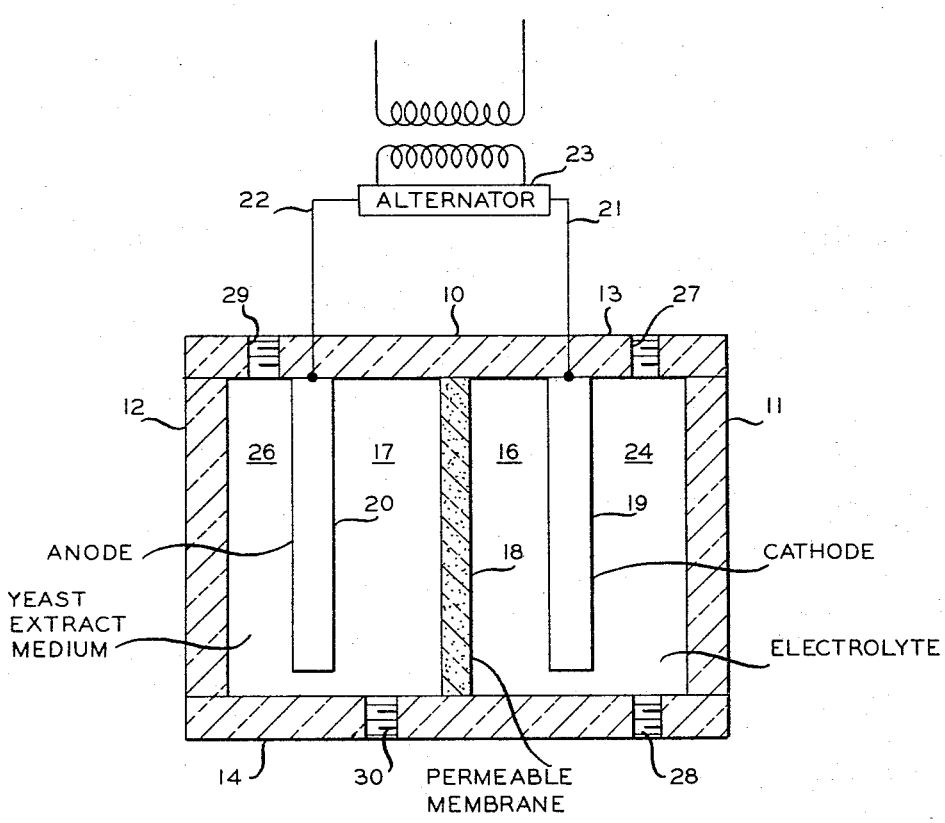

3,340,094
BIOCHEMICAL FUEL CELL AND METHOD OF GENERATING ELECTRIC CURRENT USING BACTERIA
Nancy A. Helmuth, Bartlesville, Okla., assignor to Phillips Petroleum Company, a corporation of Delaware
Filed Apr. 26, 1963, Ser. No. 275,874
16 Claims. (Cl. 136—86)

This invention relates to a method of generating electric current by means of a biochemical reaction. In another aspect, this invention relates to a method of generating electric current by means of a photosynthetic biochemical reaction conducted in a fuel cell.

Presently employed conventional methods of generating electrical energy are known to be relatively inefficient. When electrical energy is generated from the heat of a chemical reaction, a fuel is generally oxidized by air and the chemical energy of the fuel converted into heat and mechanical energy. The heat and mechanical energy are then employed in gas turbines or steam turbines connected to generators to so provide the electrical energy. The overall efficiency of the conversion of the chemical energy of the fuel into electrical energy is considerably less than about 50 percent. To avoid this inefficiency, it has been suggested that fuel cells be employed to convert the chemical energy of the fuel directly into electrical energy without the intermediate conversion of the fuel energy into heat and mechanical energy.

Solar energy is converted into chemical energy through photosynthetic processes of, for example, marine algae. The chemical energy is stored, temporarily, largely in the form of plant carbohydrate. Carbohydrate may be converted to other forms of organic matter after ingestion by marine animals, or degraded after death of the algae, by bacteria. If it were possible to directly produce electrical energy through the action of photosynthetic bacteria, it would potentially provide a low-cost source of electrical energy.

By my invention, I have provided a method of directly producing electrical energy through the biochemical reaction of photosynthetic bacteria.

Accordingly, an object of my invention is to provide for the direct production of electrical energy from the reaction of photosynthetic bacteria.

Another object of my invention is to provide a fuel cell.

Other objects, advantages and features of my invention will be readily apparent from the following description and the appended claims.

The drawing is a cross-sectional view in elevation of one embodiment of the fuel cell of this invention.

For a better understanding of the invention, reference is now made to the drawing, wherein a fuel cell generally designated 10 is illustrated. Fuel cell 10 comprises a generally rectangular casing or holder made of a suitably inert non-conductive material capable of transmitting visible light, such as plastic, e.g. Lucite. The fuel cell casing can be comprised of side plate members 11, 12, a top closure plate member 13 and bottom plate member 14. Such plate members can be secured together by bolts, bands, etc., with suitable sealants, such as asbestos fiber, or sealing means, such as O-rings, between adjacent plate members.

Fuel cell 10 is comprised of compartments 16 and 17 separated by a conventional cation or anion permeable membrane 18. The membranes can be prepared by the method disclosed in U.S. Patent 2,636,851.

Disposed within compartment 16 is a cathode 19 and disposed within compartment 17 is an anode 20. The electrodes can be fabricated from conventional materials such as carbon, graphite, copper oxide, iron oxides, nickel oxide, copper, zinc, magnesium or nickel ferrides, palladium, platinum or fused mixtures of copper, nickel, iron oxides and silver. The preparation of these electrodes is well known in the art and reference is made to U.S. Patent 2,276,188, issued Mar. 10, 1942, to Greger, for the description of a typical electrode preparation process.

Each of electrodes 19, 20 is connected to suitable conductors 21, 22, respectively, to complete an external circuit. Conductors 21, 22 can be connected to a suitable load. For example, they can be connected to an alternator 23 or the like for conversion of the low voltage direct current to alternating current, which can have its voltage stepped up by a transformer.

Within compartment 16 of fuel cell 10 is a space filled with electrolyte. The electrolyte employed in the inventive fuel cell can be an aqueous solution of acid, alkali, or salt, or a membrane or ion-exchange resin capable of ion transfer. For example, aqueous solutions of potassium chloride, sodium chloride and alkaline electrolytes comprising aqueous solutions of alkali metal hydroxides, carbonates, or bicarbonates can be employed. Dilute acid solutions, such as hydrochloric or aqueous sulfuric acid, can also be employed. The electrolyte can be changed periodically for purposes of replenishment or for the removal of impurities therefrom, such as carbonates and excess water. The top closure plate 13 can be provided with a suitable plug and opening 27 for filling the compartment with electrolyte and a suitable plug and opening 28 to permit exhaust of the electrolyte.

The biochemical cell (compartment 17) is filled with a protein digest or extract medium. The protein digest or extract, hereinafter referred to as a protein extract, comprises an acidic, alkaline, enzymatic, or hydrolysis protein extract of beef, yeast, malt, soya, casein, etc. The medium is comprised of the extract, a mineral salt, and water. The extract and medium can be prepared by any conventional method. Reference is made to Bacteriological Reviews, volume 15, No. 4, December 1951, by Howard Gest, for a description of the preparation of media. The invention, although not to be limited thereto, will hereinafter be specifically described using a yeast extract medium.

Compartment 17 is filled with a yeast extract medium, said yeast extract medium comprising peptone, yeast extract, sodium chloride, and water. The yeast extract is the water soluble portion of autolyzed fresh yeast. Normally the concentration of the constituents in the yeast extract medium will comprise from 1–30 grams peptone, 1–10 grams of yeast extract, and 1–10 grams of sodium chloride per 1000 ml. of water. A preferred yeast extract medium, although not to be limited thereto, comprises 10 grams peptone, 5 grams of yeast extract, and 5 grams of sodium chloride per 1000 ml. of water. The top closure plate 13 can be provided with a suitable plug and opening 29 for filling compartment 17 with the yeast extract medium and a suitable plug and opening 30 for withdrawing the yeast extract medium from compartment 17 when desired.

The bacteria employed in the biochemical fuel cell and placed within the yeast extract medium of compartment 17 are selected from the group consisting of *Rhodopseudomonas spheroides*, *Rhodopseudomonas gelatinosa*, *Rhodopseudomonas capsulata*, *Rhodopseudomonas palustris* and *Rhodospirillum rubrum*. The bacteria found to maximize the production of electrical energy, and therefore preferred, are *Rhodopseudomonas spheroides* and *Rhodospirillum rubrum*.

The selected bacteria are placed in the yeast extract medium within compartment 17 and are grown anaerobically in the presence of light continuously transmitted to compartment 17 through the walled members of fuel cell 10. The light transmitted to compartment 17 is visible light or white light, normally considered as electromagnetic waves having a wave length ranging from 4000 Angstroms to 7800 Angstroms.

The temperature within compartment 17 is preferably maintained in the range of 28° C. to 35° C., although temperatures outside this range can be employed. Although not herein illustrated, it is within the scope of this invention to provide a heat exchange means within compartment 17 to thus maintain the temperature within a desired range.

As the bacteria grow in the yeast extract medium, the yeast extract medium is reduced, heat is lost and oxidation products such as water and carbon dioxide are liberated. Under the anaerobic conditions of compartment 17, this reduction potential becomes appreciable. It is believed that this is probably the source of most, if not all, the energy obtained. The bacterial photosynthesis reaction can be expressed by the following equation:

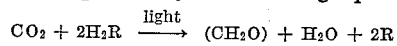

$$CO_2 + 2H_2R \xrightarrow{light} (CH_2O) + H_2O + 2R$$

where R=the remainder of the molecule from which the hydrogen is abstracted. $(CH_2O)$=an organic compound-cell-building material.

The following example is presented to illustrate the effectiveness of the invention to produce an electric current. It is not intended that the invention should be limited to the embodiments illustrated therein.

*Example*

An electrolytic solution comprising an aqueous solution of sodium chloride wherein the concentration of sodium chloride consisted of 0.5 weight percent was prepared. Into this electrolytic solution was placed a platinum wire cathode having an area of 10.9 square centimeters.

A yeast extract medium was prepared comprising 10 grams peptone, 5 grams of yeast extract, and 5 grams of sodium chloride in 1000 ml. of water. A platinum wire anode having an area of 10.9 square centimeters was placed in the yeast extract medium. The yeast extract medium was separated from the sodium chloride solution by a cation permeable membrane.

*Rhodopseudomonas spheroides* bacteria were placed in the biochemical cell and light was transmitted to the biochemical cell from an electric light bulb for a period of 28 days. The temperature of the biochemical cell was maintained between 28° and 35° C. The anode and cathode were connected in a circuit with various resistances as illustrated below in the table. Upon measuring the current and voltage produced by the inventive fuel cell with a conventional microammeter and voltmeter, the following results illustrated in the table were obtained.

TABLE

| Test Period | Resistance R (ohms) | Current, microamps | Voltage, millivolts | Power, microwatts |
|---|---|---|---|---|
| After 16 days | 100 | 72 | 7.2 | 0.55 |
|  | 1,000 | 52 | 52 | 2.7 |
|  | 2,500 | 38 | 95 | 3.6 |
|  | 5,000 | 28 | 140 | 3.9 |
|  | 10,000 | 19.2 | 192 | 3.7 |
|  | 25,000 | 11 | 275 | 3 |
|  | 50,000 | 6.5 | 325 | 2.1 |
|  | 100,000 | 3.5 | 350 | 1.2 |
| After 23 days | 1,000 | 54 | 54 | 2.92 |
|  | 2,500 | 41 | 102.5 | 4.1 |
|  | 5,000 | 30 | 150 | 4.5 |
|  | 10,000 | 21 | 210 | 4.41 |
|  | 25,000 | 11.3 | 282.5 | 3.19 |
|  | 50,000 | 6.7 | 335 | 2.24 |
|  | 100,000 | 3.7 | 370 | 1.37 |

As will be evident to those skilled in the art, various modifications of this invention can be made, or followed, in view of the foregoing disclosure and the appended claims.

I claim:

1. A method of generating an electric current which comprises passing an electrolyte to a cathode zone containing an electrode, passing an oxygen-free protein extract medium to a second zone containing an electrode, said cathode and anode zones separated by a material selected from the group consisting of cation and anion permeable membranes, placing in said anode zone bacteria selected from the group consisting of *Rhodopseudomonas spheroids, Rhodopseudomonas gelatinosa, Rhodopseudomonas capsulata, Rhodopseudomonas palustris* and *Rhodospirillum rubrum*, and passing visible light to said anode zone.

2. The method of claim 1 wherein the temperature within said anode zone is maintained in the range of 25° to 35° C.

3. The method of claim 2 wherein said protein extract medium is a yeast extract medium.

4. The method of claim 3 wherein said bacteria is *Rhodopseudomonas spheroides*.

5. The method of claim 4 wherein said electrodes are platinum, said electrolyte is as solution of sodium chloride and said permeable membrane is a cation permeable membrane.

6. A sealed, self-containing fuel cell comprising a container having a first compartment and a second compartment, said first and second compartments separated by a material selected from the group consisting of anion and cation permeable membranes, said first compartment containing an electrode and an electrolyte, said electrode at least partially immersed in said electrolyte, said second compartment containing an oxygen-free protein extract medium, a second electrode and bacteria selected from the group consisting of *Rhodopseudomonas spheroides, Rhodopseudomonas gelatinosa, Rhodopseudomonas capsulata, Rhodopseudomonas palustris,* and *Rhodospirillum rubrum*, said bacteria dispersed within said oxygen-free protein extract medium, and said second electrode at least partially immersed therein, means for transmitting visible light to said second compartment and current means connected between said electrode and said second electrode to pass generated current therebetween.

7. The fuel cell of claim 6 to include means for maintaining the temperature in said second compartment in the range of 28° to 35° C.

8. The fuel cell of claim 7 wherein said protein extract medium is a yeast extract medium.

9. The fuel cell of claim 8 wherein said bacteria is *Rhodopseudomonas spheroides*.

10. The fuel cell of claim 9 wherein said electrodes are platinum, said electrolyte is a solution of sodium chloride, and said permeable membrane is a cation permeable membrane.

11. The sealed, self-contained fuel cell of claim 9 wherein said first and second compartments have openings for introducing fluid therein and exhausting fluid therefrom, said openings having sealing plug means operatively positioned therein.

12. A sealed, self-containing fuel cell comprising a container having a first compartment and a second compartment, said second compartment enclosed by a transparent wall section capable of transmitting visible light, said first and second compartments separated by a material selected from a group consisting of anion and cation permeable membranes, said first compartment containing an electrode and an electrolyte, said electrode at least partially immersed in said electrolyte, said second compartment containing an oxygen-free protein extract medium, a second electrode and a bacteria selected from the group consisting of *Rhodopseudomonas spheroides, Rhodopseudomonas gelatinosa, Rhodopseudomonas capsulata, Rhodopseudomonas palustris,* and *Rhodospirillum rubrum*, said bacteria being dispersed within said oxygen-free extract medium, and said second electrode at least partially immersed therein, and a circuit means connected between said anode and cathode to pass generated current from said anode to said cathode.

13. The fuel cell of claim 12 to include means for maintaining the temperature in the second compartment in the range of 28 to 35° C.

14. The fuel cell of claim 13 wherein said protein extract medium is a yeast extract medium, and said bacteria is *Rhodopseudomonas spheroides*.

15. The fuel cell of claim 14 wherein said electrolyte is a solution of sodium chloride, and said permeable membrane is a cation permeable membrane.

16. The sealed, self-contained fuel cell of claim 15 wherein said first and second compartments have openings for introducing fluid therein and exhausting fluid therefrom, said openings having sealing plug means operatively positioned therein.

References Cited

UNITED STATES PATENTS

| 3,113,049 | 12/1963 | Worsham | 136—86 |
| 3,188,241 | 6/1965 | Weiss et al. | 136—86 |
| 3,228,799 | 1/1966 | Rohrback | 136—86 |

OTHER REFERENCES

Bergey's Manual of Determinative Bacteriology, The Williams and Wilkins Co., 7th edition, pages 53–59, 1957.

Pursglove, S. David: Science and Mechanics, August 1961, pages 116 and 117.

WINSTON A. DOUGLAS, *Primary Examiner.*

ALLEN B. CURTIS, *Assistant Examiner.*

UNITED STATES PATENT OFFICE
CERTIFICATE OF CORRECTION

Patent No. 3,340,094                  September 5, 1967

Nancy A. Helmuth

It is certified that error appears in the above identified patent and that said Letters Patent are hereby corrected as shown below:

Column 4, line 3, "a second" should read -- an anode --.

Signed and sealed this 13th day of January 1970.

(SEAL)
Attest:

Edward M. Fletcher, Jr.
Attesting Officer

WILLIAM E. SCHUYLER, JR
Commissioner of Patents